United States Patent [19]
laBastide, Jr.

[11] Patent Number: 5,335,978
[45] Date of Patent: Aug. 9, 1994

[54] SERVICE BRAKE INSPECTION SYSTEM

[75] Inventor: Bernhardt R. laBastide, Jr., Fort Wayne, Ind.

[73] Assignee: Navistar International Transportation Corp., Chicago, Ill.

[21] Appl. No.: 52,252

[22] Filed: Apr. 23, 1993

[51] Int. Cl.⁵ .............................................. B60T 13/00
[52] U.S. Cl. ...................................... 303/13; 188/170; 303/9.76; 303/14; 303/60
[58] Field of Search ....................... 303/13, 7, 8, 9, 14, 303/18, 9.76, 1, 71, 81, 86, 50, 52, 56, 60, 28, 29, 30, 2; 188/170, 3 R, 3 H, 112 R

[56] References Cited

U.S. PATENT DOCUMENTS 5,036,961 8/1991 Eberling et al. ...................... 303/13
5,226,692 7/1993 Eberling ................................. 303/8

*Primary Examiner*—Douglas C. Butler
*Attorney, Agent, or Firm*—Dennis K. Sullivan

[57] ABSTRACT

A service brake inspection system engages service brake air lines downstream of a foot operated activation valve thereof to provide continuous engagement of the service brakes during inspection. The system includes a manually controlled air line which supplies air to a source port of an inversion valve. The inversion valve further includes an outlet port which is engaged to air lines supplying the vehicle service brake system via a double check valve in each of the primary and secondary service brake air lines, each being downstream of the foot operated valve. A third control port is connected to an air line disposed between a hand operated valve for exhausting the air lines to the spring parking brakes to set the parking brakes of the vehicle on. When the hand operated exhaust valve is set on, the pathway from the source to the outlet port in the inversion valve is opened to cause the service brakes to be continuously engaged for inspection.

5 Claims, 2 Drawing Sheets

SERVICE BRAKE INSPECTION SYSTEM

BACKGROUND OF THE INVENTION

The present invention is related to a service brake inspection system for maintaining the service brakes of an air brake system engaged while the parking or emergency brake system is also engaged to allow the operator to check slack adjustment of all service brakes, including those of a trailer, without assistance. More specifically, the system includes a manually-activated valve which is operable to maintain the service brakes of the vehicle engaged and further includes a safety feature which makes the system actuatable only when the emergency/parking brakes of the vehicle are also applied, so that the system cannot be activated while in the driving mode.

THE PRIOR ART

Heretofore, the checking of service brake slack adjustment in an air brake system has been a two person operation. A first person was required to maintain the service brakes engaged while a second person checked the slack adjustment. Presently, transportation requirements are proposed which require visible adjustment indicators in service brake systems and which also require that the slack adjustment can be checked by a single person, for example, by a truck operator parked alongside a highway.

SUMMARY OF THE INVENTION

Accordingly, it is a primary object of the service brake inspection system disclosed and claimed herein to allow a single person the ability to check the slack adjustment of the service brakes in an air brake system of a vehicle.

A further object of the invention is to provide a service brake inspection system which cannot be accidentally activated while the vehicle is in a drive mode.

A more specific object of the invention is to provide a system for engaging the service brakes of a vehicle for inspection while maintaining the parking/emergency spring brakes engaged.

These and other objects are met by the service brake inspection system of the present invention which incorporates a manually operated valve which engages and maintains engaged the vehicle and trailer service brakes when the emergency/parking brakes are applied to allow a single person to check the slack adjustment on the service brakes. The mechanical spring brakes are maintained engaged by the system as a safety feature to prevent the inspection system from being engaged accidentally during normal truck operation.

DESCRIPTION OF THE PREFERRED EMBODIMENTS

Figure 1:
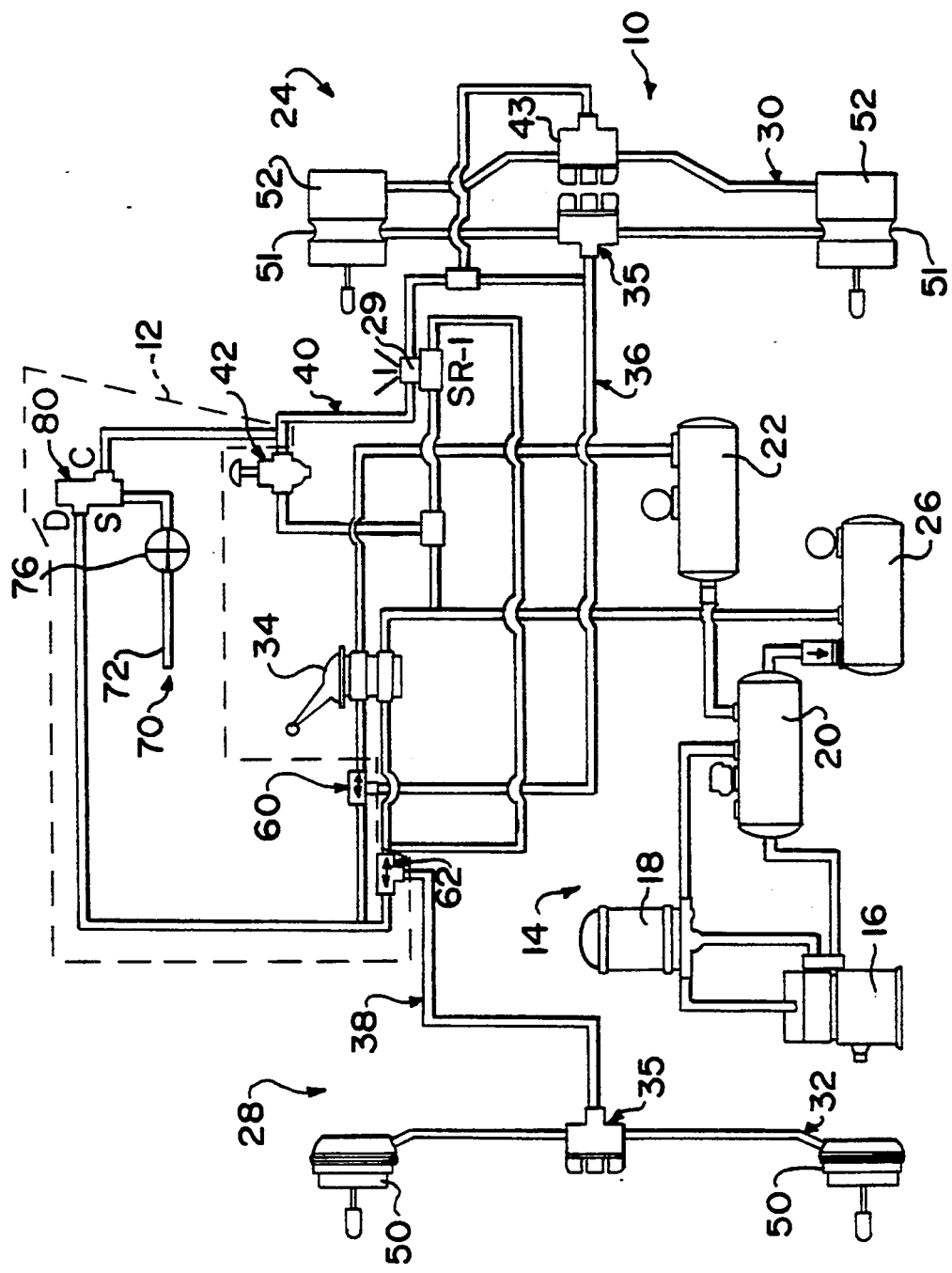
FIG. 1 is a schematic block diagram showing the service brake inspection system of the present invention within a phantom outline and incorporated into the air brake system of a two axle truck.

Referring now to the drawings in greater detail, there is illustrated in FIG. 1 a schematic block diagram of an air brake system 10 for a two axle truck which has been improved to incorporate the service brake inspection system of the present invention outlined by phantom lines and generally identified by the reference numeral 12.

The air brake system 10 includes a supply system 14 including a compressor 16, an air dryer 18 and a wet tank 20, with air from the wet tank 20 being fed into a primary tank 22 feeding a primary brake system 24 and into a secondary air tank 26 feeding a secondary brake system 28. The primary brake system 24 is provided to actuate service brake chambers 51 on the rear axle 30 of the vehicle and the secondary brake system 28 is provided to actuate service brake chambers 50 on the front axle 32 of the vehicle. Conventional quick release valves 35 are provided at the axles in the air supply lines 36 and 38 of both brake systems 24 and 28. The quick release valves are responsive to release of the brake pedal 34 to quickly exhaust the pressure from the brake system. A valve 29 is provided to connect the primary system 24 to the secondary air tank 26 in the event of a loss of pressure in the primary system. Both the primary system 24 and the secondary system 28 are actuated by a foot brake valve or pedal 34 within the driver's compartment (not shown) of the vehicle.

The primary air brake system 24 includes a conventional mechanical parking/emergency spring brake system 40 on the rear axle. The spring powered brakes (not shown) are integrated with the rear axle service brakes but have separate spring brake cylinders 52 which maintain the spring brakes in an inactive mode by air pressure supplied through parking brake valve 42 and quick release valve 43 from tank 26 but operate under certain circumstances. First, the spring brake system 40 will automatically engage and lock the vehicle spring brakes cylinders 52 "on" if the air pressure in the service brake systems 24 and 28 falls below a predetermined level sufficient to stop the vehicle, allowing the springs to expand and lock the brakes in an emergency. Second, the spring brake system 40 is manually activated by parking brake valve 42 when a driver sets the parking brakes of the vehicle by cutting off the supply pressure to the spring brake cylinders 52 which causes quick release valve 43 to release the pressure on the spring brakes.

Since the service brake systems 24 and 28 will not be active unless the brake pedal 34 is depressed, to permit a single individual to check the slack adjustment of all of the service brakes of the vehicle, the slack adjustment only being measurable when the service brakes are applied and functioning, the service brake inspection system 12 of the present invention is proposed.

As shown, this system 12 can be incorporated into the brake system 10 of a two axle straight truck (FIG. 1) or a three axle semi-tractor (FIG. 2), with only minor structural additions being required for each existing system.

In the two axle system of FIG. 1, the air brake system 10 and the service brake inspection system 12 must function in a manner so that the service brake inspection system 12 cannot be activated while the vehicle is in motion. Thus, it must be integrated into the system 10 in a manner where activation is dependent upon engagement of the spring brake control valve 42 of the vehicle by manual operation in the vehicle cab (not shown). The service brake inspection system 12 acts upon the service brakes of the system 10 by creating and maintaining sufficient air pressure within service brake cylinders 51 to set them completely on.

To accomplish this goal, a double check valve 60 is placed in the primary air system line 36 and another double check valve 62 is engaged in the secondary air system line 38, downstream of the brake foot pedal 34 in both instances. The valves 60 and 62 create a pathway for connecting the service brake inspection system 12 into the brake system 10 while preventing pressure leakage to the pedal valve 34 when the inspection system 12 is being used and preventing pressure leakage to the inspection system 12 when the service brake system 10 is being used.

The inspection system 12 air supply line 72 is provided with air at 70 directly from the air supply 14 of the vehicle through a connection thereto (not shown). Air supply line 72 is provided a suitable manually operated shutoff valve 76 which is preferably located in the vehicle cab. When opened, the valve 76 supplies air to an inversion valve 80 of the type commonly referred to as a TR3 inversion valve. This inversion valve 80 has three ports, which are labelled herein as S, D and C. The S port is a source port where air enters the valve 80 from the manual valve 76. The port D is an outlet or discharge port for the valve 80 which supplies air pressure to the primary and secondary air feed lines 36 and 38 respectively through the double check valves 60 and 62.

However, the supply of air to the lines 36 and 38 through valve 80 can only take place when there is no air pressure at control port C of valve 80. Such a condition exists whenever hand parking brake valve 42 is engaged to set the parking brakes, thus preventing airflow to the brake chambers 52 to allow the mechanical springs therein to expand and set the vehicle parking brakes on. In contrast, when the hand parking brake valve 42 is not engaged to set the parking brakes, as during normal operation of the vehicle, air pressure is being supplied to port C, thereby maintaining port D closed to prevent accidental engagement of the system 12 (which could override the normal control by brake pedal 34) when the vehicle is in the running mode of operation.

Thus, a closed loop auxiliary service brake inspection system 12 is created, which, when actuated, engages and maintains the vehicle service brake system 10 engaged so that a driver may single handedly check brake slack adjustment.

Figure 2:
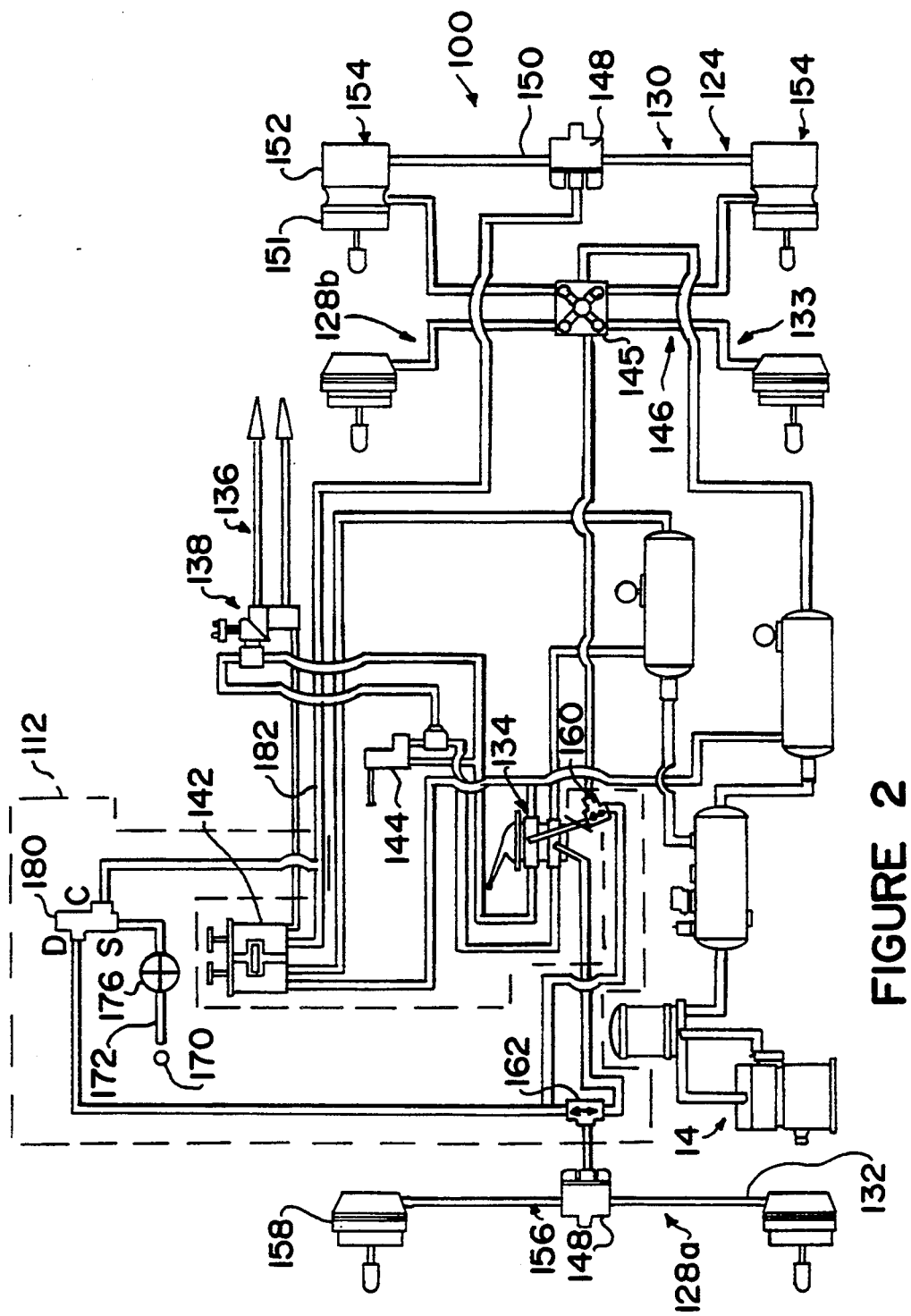
FIG. 2 is a schematic block diagram showing the service brake inspection system of the present invention within a phantom outline and incorporated into an air brake system of a three axle semi-tractor.

In theory and practice, the identical arrangement, with minor adjustment to suit a dual rear axle and an engaged trailer, is provided for use on a semi-tractor, as shown in FIG. 2. Here, the service brake system 100 has an air supply system 114 identical to that shown in FIG. 1. Also a primary brake system 124 and 128b is provided on a rear axle(s) of the tractor with secondary brake system 128a being provided on a front axle 132. Again both systems are activated by foot pedal 134.

A subsystem 136 is also provided for activation of trailer brakes if a trailer is engaged. A tractor protection valve 138 is incorporated herein to protect the tractor brake system 100 if trailer brake failure should occur.

The system 100 here, too, includes a valve 142 which is hand operated to set tractor and trailer emergency/parking brakes on manually. A separate manually controlled trailer brake valve 144 is also supplied which may be operated to create a trailer drag slightly ahead of tractor braking, increasing braking control.

The system 100 here is provided with a relay valve 145 in the rear axle air lines 146 to the service brake chambers 151 and a quick release valve 148 in the air line 150 feeding the parking brake chamber 152 of the rear rear brakes 154 as well as in the air lines 156 feeding the front service brake chambers 158.

Here the service brake inspection system 112 again includes a double check valve 160 in the air lines 146 feeding the rear axles 130 and 133 and a double check valve 162 in the air line 156 for the front axle 132, these valves 160 and 162 being downstream of foot pedal 134 and forming the path by which the system 112 is integrated into the brake system 100.

The service brake inspection system 112 is connected through a hand operated valve 176 in an air line 172 to an air source at 170. An inversion valve 180 is again provided which operates identically to the valve 80 described in connection with the description of FIG. 1. The control port C is connected to an air line 182 which is exhausted manually to release the spring parking brakes 152 on the rear rear axle 130 via quick release valve 148. With no pressure at control port C, the inversion valve 180 permits flow from the supply valve 176 to the discharge port D and then to all of the service brake chambers setting the service brakes completely on to permit inspection. Again, if pressure were present in air line 182 to the parking brake chambers 152, as in normal highway operation, the inspection system 112 cannot be engaged.

As described above, the air brake inspection systems described provide a number of advantages, some of which have been described above and others of which are inherent in the invention. Also, modifications may be proposed without departing from the teachings herein. Accordingly, the scope of the invention is only to be limited as necessitated by the accompanying claims.

What is claimed is:

1. In an air brake equipped vehicle of the type having air pressure actuated service brakes and spring-actuated parking brakes, said parking brakes being released by air pressure supplied through a supply line from a manually-actuated parking brake control valve, an auxiliary service brake inspection system comprising:
   manually operated service brake valve means connected to a continuous vehicle air supply source for engaging the inspection system;
   means for carrying pressurized air through the inspection system when said service brake valve means are set to engage the inspection system; and
   an inversion valve operatively engaged within the air carrying means and disposed to continuously maintain an open air passage from said manually operated service brake valve means to said service brakes upon the absence of pressure in said air supply line to spring actuated parking brakes of the vehicle;
   said means for carrying pressurized air being in communication with the service brake system via a double check valve arrangement.

2. The system of claim 1 wherein one double check valve is placed in a brake line servicing front brakes of the vehicle downstream of a brake foot pedal.

3. The system of claim 2 wherein one double check valve is placed in a brake line servicing rear brakes of the vehicle downstream of a brake foot pedal.

4. The system of claim 1 wherein said inversion valve has an outlet engaged in an air line feeding into the air lines for the service brake system.

5. In a vehicle having an air powered, foot pedal operated service brake system, including service brakes and service brake air lines, and a vehicle air reservoir in combination with a mechanical, hand valve operated spring brake system, wherein operation of the air brake system is overridden upon engagement of the spring brake system, a service brake inspection system for use in continuously engaging the service brakes to allow for checking of the service brakes by a single person, the service brake inspection system including:

an air supply line connected to said vehicle air reservoir;

a hand-operated inspection valve seated within the air supply line, said inspection valve being independent of said spring brake system;

an inversion valve having a source input port, a discharge port and a control port, said air supply line engaging said source input port;

an inspection air line connected between said discharge port of said inversion valve and said air lines feeding the service brakes of the vehicle at locations thereon downstream of the foot pedal used to engage said service brakes; and an air control line connected between said control port of said inversion valve and a spring brake activating air exhaust line at a point thereon downstream of a hand operated valve having a brake-applied position disposed to exhaust air from said spring brake system, said control port allowing communication between said source input port and said discharge port when said hand operated valve is in said brake-applied position.

\* \* \* \* \*